United States Patent [19]

Burgess et al.

[11] 4,263,365
[45] Apr. 21, 1981

[54] FIRE-RESISTANT SAFE AND PANEL

[75] Inventors: George M. Burgess, Webster; Roland M. Avery, Jr., Pittsford, both of N.Y.

[73] Assignee: John D. Brush & Co., Inc., Rochester, N.Y.

[21] Appl. No.: 62,910

[22] Filed: Aug. 2, 1979

[51] Int. Cl.³ .................................................. B32B 5/18
[52] U.S. Cl. ........................................ 428/310; 106/75; 106/76; 106/87; 106/90; 106/93; 106/99; 109/76; 109/78; 264/42; 428/70; 428/71; 428/313; 428/913; 428/921; 428/448; 252/70
[58] Field of Search ................ 106/87, 90, 93, 99, 106/75, 76; 428/310, 538, 313, 539, 920, 913, 921, 70, 71; 109/76, 78; 264/42

[56] References Cited

U.S. PATENT DOCUMENTS

| 3,451,842 | 6/1969 | Kurz et al. | 428/425 |
|---|---|---|---|
| 3,607,605 | 9/1971 | Suzukawa | 428/538 |
| 3,758,319 | 9/1973 | Ergene | 106/90 |
| 3,947,284 | 3/1976 | Kitsugi et al. | 106/90 |
| 4,048,926 | 9/1977 | Brush, Jr. et al. | 109/83 |
| 4,132,555 | 1/1979 | Barrable | 106/90 |
| 4,132,556 | 1/1979 | Camprincoli et al. | 106/90 |

Primary Examiner—William J. Van Balen
Attorney, Agent, or Firm—Stonebraker, Shepard & Stephens

[57] ABSTRACT

A heat absorbing body made from a mixture of water, Portland cement, cellulose fibers, and a foaming agent, with or without other ingredients such as water glass and sodium sulfate. Polypropylene fibers may be used in place of part or all of the cellulose fibers. Cellulose fibers (conveniently reclaimed or recycled cellulose fibers) are preferably used because of their ability to absorb and retain relatively large amounts of water in the composition. Various formulas are given for the mixture. The material is used as a filling for the walls of fire resistant safes and storage boxes, and also for the construction of structural panels for furniture and building construction, and for cast-in-place walls and floors and roofs of buildings. In addition to the ability of the material to absorb heat in case of fire and thus keep the contents of a safe or container or room cooler than would otherwise be the case, the material is useful for heat storage and retrieval, absorbing and storing waste heat or solar heat during a hot day, and giving up or re-radiating the stored heat when needed, such as during a cool night.

24 Claims, 3 Drawing Figures

FIRE-RESISTANT SAFE AND PANEL

BACKGROUND OF THE INVENTION

In the art of fire-resistant safes, it is known that one of the important factors in keeping the contents of the safe cool when there is a surrounding fire, is that the composition or filling which makes up the thickness of the wall of the safe includes a large amount of water in various forms or retained in various ways, as for example by absorption or adsorption. The water is valuable in helping to keep the interior of the safe cool, because it absorbs a great deal of heat when passing from liquid phase to vapor phase, since this requires the input of the heat of vaporization. It is therefore desirable, when constructing safes, to use a composition or filling in the wall which contains as much water as reasonably possible.

These principles apply equally to fire-resistant storage boxes, drawers, filing cabinets, or other containers intended to provide some degree of fire protection, and are not limited to safes which are intended to provide burglary protection as well as fire protection. The term fire-resistant container as used hereafter is intended in a generic sense as including safes which may give at least some degree of burglary protection in addition to fire resistance or fire protection, as well as the other mentioned types of containers which may give fire resistance or protection without necessarily providing burglary protection. The principles of the invention apply also to the walls of fire-resistant vaults or rooms permanently built into buildings, and to construction panels which may be utilized in various specialized construction projects, including the construction of walls, roofs, or other parts of special structures where cooling effects or heat-absorbing effects are desired.

In order to retain a large amount of water, various safe manufacturers use a number of known materials, including asbestos, perlite, diatomaceous earth, and vermiculite in the composition used in the filling in the wall of the safe or other container. When vermiculite is used, it has customarily been used, for example, to the extent of about 10 percent by weight of the ingredients making up the filling composition. However, vermiculite is becoming increasingly scarce and increasingly expensive, so that an acceptable substitute for vermiculite is highly desirable. The present invention relates to the discovery of unexpected and valuable properties of certain other materials which can be used satisfactorily to hold the desired amount of water in the filling composition and which will give the composition sufficient strength, enabling the elimination of the vermiculite heretofore thought to be desirable.

SUMMARY OF THE INVENTION

According to the invention it is found that cellulose fibers (either new or recycled) produced for example by recycling newsprint stock or corrugated kraft scrap, or a mixture of both, can be used to a substantial extent as a component of the filling composition, with the surprising result that these cellulose fibers not only will retain a very desirable amount of water in the composition but also will not adversely affect the strength of the composition for present purposes. Moreover, it is found according to the invention that certain plastic fibers, particularly polypropylene fibers, can be used in place of vermiculite, either alone or in combination with the above mentioned cellulose fibers, and these polypropylene fibers not only help to keep the mixture from separating while it is setting up or hardening, but also serve as reinforcement to strengthen the composition. This is especially valuable in a safe or other container which does not have a permanent outer jacket such as a metal jacket, but which has a plastic jacket which burns away during the early stages of a fire, leaving the wall filling exposed. With such a construction, a high strength wall filling is important, because the plastic outer jacket may burn off before the floor of the building burns out and gives way, so that when the safe or container falls through the floor to a lower floor or to the basement of the building, there is no jacket to protect the wall from shattering.

DESCRIPTION OF THE PREFERRED EMBODIMENTS

Figure 1:
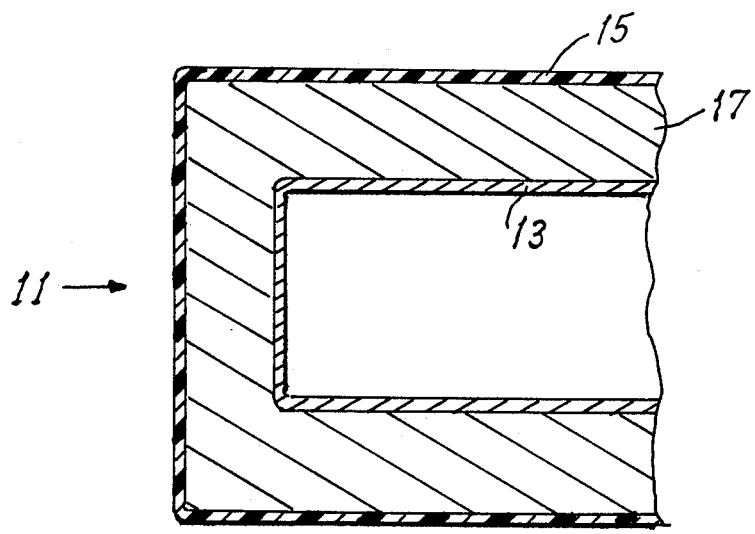
FIG. 1 is a schematic cross section through a fragment of a plastic jacketed safe in accordance with a preferred embodiment of the invention.

Referring now to FIG. 1, there is shown a fragment of a fire resistant container indicated in general at 11. This may be a safe having some degree of burglary protection or resistance in addition to fire resistance, or may be a filing cabinet, a storage box, a drawer, or any other desired kind of a container. It may also be a fire resistant vault or room built into a building. The fragment here shown has an inner liner 13, an out jacket 15 (both collectively referred to as shells) and a filling 17 between the inner and outer shells, the wall thickness of the filling 17 being of any desired extent. It may, for example, vary in thickness from perhaps half an inch, in a small drawer or box, to six inches or more in a large safe or large box, or perhaps even a foot or more in the walls of a vault or storage room in a building.

The container may be of any desired size or shape. What is here illustrated is intended merely as a schematic showing of a container, regardless of size or shape. The container in general, except for the different composition of the filling between the inner and outer liner, may of any conventional kind, as for example the kind disclosed in Brush and Burgess U.S. Pat. No. 4,048,926, granted Sept. 20, 1977, and the present invention may be considered in some respects as an improvement on what is disclosed in that patent. The entire disclosure of the patent is incorporated herein by reference.

In FIG. 1, both the inner liner 13 and the outer jacket or shell 15 may be of plastic material, as disclosed in said patent. It is now preferred, however, to use plastic material for the outer jacket 15, but to use steel for the liner 13. However, it is to the composition of the wall filling 17 that the present invention relates, rather than to the material of the shell members 13 and 15 or the shape or size of the container or the shape or characteristics of the door or closure which may be used in connection therewith.

Figure 2:
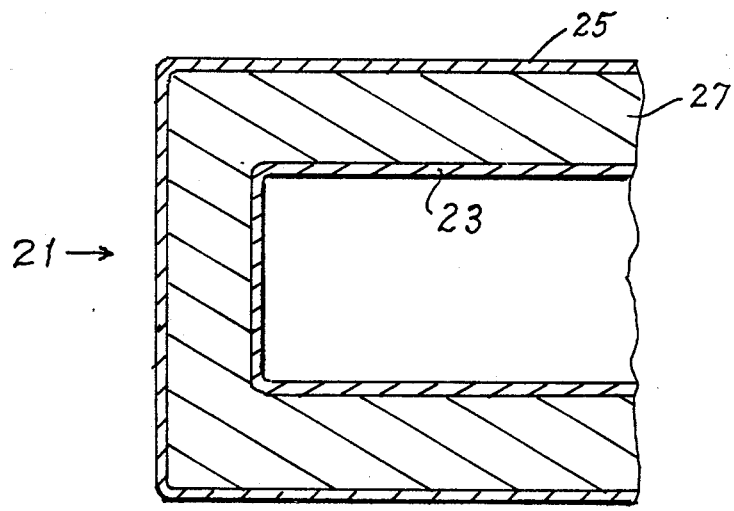
FIG. 2 is a similar section through a fragment of a steel jacketed safe according to another embodiment of the invention.

FIG. 2 is intended to show, likewise schematically, a container 21 of any desired size or shape, similar in general to FIG. 1 except that the outer jacket 25 is here of steel or other strong metal, rather than plastic. The inner liner 23 is preferably also of metal such as steel. The filling 27, like the filling 17 in FIG. 1, is of the novel composition of the present invention, as described below.

As already indicated, one of the important features of the present invention is the use of cellulose fibers in the filler composition, as a means for retaining a desired amount of water in the composition, while eliminating the vermiculite heretofore frequently used in such compositions. New fibers may be used, but because of their abundant availability and moderate cost, it is ordinarily preferred to use recycled cellulose fibers (hereinafter sometimes referred to for brevity as RCF). In addition to the RCF, which is used to a significant amount, the composition also includes a major amount of Portland cement (hereinafter referred to for convenience as PC) and a foaming agent or material, as well as water. In addition, when the container is intended to be able to withstand a severe drop or impact and when it is not protected by a permanent or nonburning metal shell or jacket, the wall filling composition also contains reinforcement, preferably polypropylene fibers.

A typical formula found to give good results when a steel jacket is used or when ability to withstand impact is not important, is given in the following example. Here, and in all other formulas, percentages are by weight.

EXAMPLE 1

| | |
|---|---|
| Water | 50.0% |
| Recycled cellulose fibers (RCF) | 1.5% |
| Portland cement (PC) | 45.5% |
| Foaming Agent (F) | 2.3% |
| 37% Sodium silicate (water glass) | 0.7% |
| | 100.0% |

To produce this mixture, the following procedure may be used:

The recycled cellulose fibers (RCF) may be produced from newspapers, or kraft paper, or even from wood chips, or from any desired mixture of these. In general, newsprint gives shorter fibers, and kraft paper gives longer fibers and therefore greater reinforcement strength. The paper or chips are shredded in a hammer mill, and the output of the hammer mill will separate into fibers when added to water and mixed.

The recycled newsprint, mixed paper, and corrugated waste, is cut, torn, or sliced, and fed into a small hammer mill, either wet or dry.

Using the material that comes from the hammer mill, a slurry of 2% to 8% of cellulose fibers in water is prepared, by adding the shredded material coming from the hammer mill to water in a high speed rotary mixer fitted with a specially designed nonclogging turbine impeller, and mixing for from 2 to 5 minutes at 200 to 1,000 revolutions per minute. The non-clogging turbine impeller is made from a sheet metal plate attached to the lower end of a vertical shaft in the mixing tank. The sheet metal plate is approximately square in shape, with two opposite corners bent down at an angle of 45 degrees to the plane of the central part of the sheet (which central part is perpendicular to the shaft) and the other two opposite corners are bent up at an angle of 45 degrees.

This special shape of turbine impeller is found to produce rapid and thorough defibrating and dispersing of the fibers and particles rather than agglomerating them as occurs with conventional paddle wheel or mortar mixers. This special design of the mixing impeller is the separate invention of Roland M. Avery, Jr., and is more fully disclosed in his patent application Ser. No. 52,544, filed June 27, 1979.

After the slurry of cellulose fibers and water has been sufficiently mixed, any desired reinforcing fibers may be added while mixing continues, if such fibers are wanted in accordance with other examples given below. But there are no such reinforcing fibers in the specific formula of this Example 1.

The Portland cement is then added in dry form, to the slurry, while mixing continues until a smooth mixture is obtained. Mixing for about 5 minutes after adding the dry Portland cement is usually sufficient.

Then the foaming agent is added. This may be done in either of two ways. The foaming agent may be pre-foamed, and then may be added to the mixing vessel in an already foamed condition, or the foaming agent in its original unfoamed condition can be added to the mixing vessel while mixing continues, adding it preferably to the central vortex created by rotation of the special turbine impeller above mentioned. In either case, mixing is continued until the mixture reaches the desired density, and then the mixer is turned off. The mixture is withdrawn through an outlet at the bottom of the mixing tank, and poured into the space between the liner 13 and the jacket 15 in order to form the filling 17, if it is to be used to form a wall of a plastic jacketed container, or is poured into the space between the liner 23 and the jacket 25 to form the filling 27 in FIG. 2, if it is to be used to form a container with a steel or other metal jacket.

The foaming agent used is preferably the material known as "Mearl Airocel PK foam liquid," available on the market from the Mearl Corporation of Roselle Park, N.J. If it is prefoamed before adding it to the mixing tank, which is preferably the case, this foam liquid is added to water in a concentration of 2% to 10% by weight, and is foamed into the mixing tank through known apparatus available on the market under the name "Mearl Foam Generator." Other foaming agents and apparatus may be used, e.g., that made by Waukesha.

The sodium silicate, 37% strength, of the kind commonly called water glass, is added to the mixing tank preferably after the foaming operation is completed, and mixing is continued for 2 to 4 minutes after this addition. Then the density of the mixture is checked, and adjusted if necessary, by addition of small amounts of water, cement, or foam as needed to bring the mixture to a density of 50 pounds per cubic foot. Then the mixture is ready for removal from the mixing chamber and pouring into the wall of the safe or other container, or into a form or mold or other confining or shaping structure for forming a wall of a room or vault, or forming a construction panel.

This formula or composition according to Example 1 has, as compared with the usual prior composition, the advantages of increased water absorption, increased stability when poured, increased impact resistance and ability to absorb crush energy, and increased elongation and tensile strength.

The cellulose fibers also have the important advantage that they tend to plug leaks in the metal shell (either liner or jacket or both) during the filling operation. This is important, because it enables the metal shell to be manufactured with greater tolerances, with less care to producing absolute water tight joints at the corners, thereby reducing the cost. Also, the use of the sodium silicate improves the stability of the mixture when poured, and improves the bonding of the fibers to each other. The preferred proportions of the mixture or composition are those set forth above in the table for Example 1. However, some of the advantages of the invention may be attained even when the proportions are varied to a considerable extent. For example, the water in the mixture may vary from 30% to 70% of the total mixture, recycled cellulose fibers may vary from 1% to 10%, the Portland cement may vary from 20% to 70%, the foaming agent may vary from zero to 6%, and the sodium silicate may vary from zero to 2%. By appropriate changes in the proportions of these ingredients, the density may be varied from 20 lbs. to 93 lbs. per cubic foot.

EXAMPLE 2

When greater input resistance is required, as for example in a safe having an outer covering or jacket of burn-away material such as plastic, a good composition for the wall filling is the following:

| | |
|---|---|
| Water | 43.0% |
| Plastic fiber (PF) | 0.5% |
| Portland cement (PC) | 53.5% |
| Foaming agent (F) | 3.0% |
| | 100.0% |

The plastic fibers are preferably polypropylene fibers of the size nominally known as 15 denier 1½ inches long. Fibers from ½ inch to 1½ inches long are useful, but it is preferred to have at least a very high percentage of them with a length of about 1½ inches. The thickness may vary from 3 denier to 20 or more denier, and a mixture of various deniers within this range is acceptable, but it is preferred to have a large proportion of the fibers of a size at or close to 15 denier.

The composition is mixed preferably by the same procedure described in connection with Example 1, with only those changes necessary because of the different ingredients. Thus the polypropylene fibers and water are added to the mixing tank and are mixed by the use of the special non-clogging turbine impeller described in connection with Example 1, to form a slurry. Then the dry Portland cement is added, and mixing is continued in the same mixing chamber or vessel, as in the previous example. The foam is added in the same manner as in the previous example. Before the composition is poured, the density is tested and is adjusted as necessary, by addition of water or cement or foam as needed to bring the mixture to a preferred density of 50 lbs per cubic foot. The mixture or composition is then poured into the space between the inner liner 13 and the outer jacket or covering 15, to form the filling 17 as shown in FIG. 1.

In this construction, the outer liner 15 is of plastic material which burns away in the early stages of a fire. Then if the building collapses or the floor burns away so that the safe or container falls, the ability of the wall composition 17 to survive the impact of falling is very important, since there is no outer protection as would be the case if there were a steel jacket around the wall. The polypropylene fibers as above described form a sufficient reinforcement for the concrete to give good impact resistance in a situation of this kind.

The use of polypropylene fibers gives improved impact resistance as compared with glass fibers which have been used in the past for reinforcing compositions of this kind. Also, the polypropylene fibers have improved resistance to the alkali in the concrete, as compared with the resistance of alkali resistant glass fibers. Also, when the polypropylene fibers are used instead of alkali resistant glass fibers, the composition has improved pouring or placing qualities. Also the mixture has improved dispersion characteristics, as compared with a similar mixture reinforced with alkali resistant glass fibers.

The proportions set forth in the above table for this example are the preferred porportions. However, the proportions may be varied while still retaining some of the advantages derived from using polypropylene fibers. The density may be varied from 20 lbs to 100 lbs per cubic foot. The water may vary from 23% to 63%, and the plastic fibers may vary from 0.1% to 2.0%, and the Portland cement may vary from 33% to 74%. The foam material may be entirely omitted if a very dense composition is wanted, or may be used in any quantity from zero to 6%.

It will be noted that in Example 1, recycled cellulose fibers are used for retaining water in the composition, and these serve also to strengthen or reinforce the cementitous composition, at least to some slight extent. In Example 2, polypropylene plastic fibers help somewhat for water retention in the composition, but mainly serve as reinforcement. The polypropylene plastic fibers give better reinforcement than the cellulose fibers, making this composition more suitable for a wall filling where there is a plastic or burn-away outer jacket or layer with no permanent metallic outer jacket.

It is possible, to combine the use of recycled cellulose fibers with the use of polypropylene plastic fibers, and thereby to produce a composition of lighter weight than the compositions of the standard preferred formulas in Example 1 and Example 2, and a preferred formula for such a composition will now be given.

EXAMPLE 3

| | |
|---|---|
| Water | 49.1% |
| Polypropylene plastic fibers (PF) | 0.5% |
| Recycled cellulose fibers (RCF) | 1.5% |
| Portland cement (PC) | 44.6% |
| Foaming agent (F) | 3.6% |
| 37% Sodium silicate | 0.7% |
| | 100.0% |

The ingredients are mixed according to the procedures previously explained in connection with Examples 1 and 2. When the ingredients are in the preferred proportions or percentages set forth in the above table, they will yield a mixture having a density of about 40 lbs per cubic foot. The density is tested before the mixture is removed from the mixing chamber, and if necessary small amounts of water, cement, or foam are added as needed to adjust the density to the desired 40 lbs per cubic foot. When this has been achieved, the impeller or rotor of the mixer is turned off, and the mixture is taken out and poured into the previously readied mold or other structure to form the desired wall, such as a wall filling 17 between the confining liners or jackets 13 and 15 in FIG. 1. This mixture can, of course, be used for the filling 27 in FIG. 2, where the outer jacket 25 is of metal, but it is also suitable for use as a comparatively lightweight wall structure where the outer jacket is of plastic material (as in FIG. 1) which burns away during a fire, leaving the outside of the wall composition 17 unprotected during the remainder of the fire. This is because of the presence of the plastic fibers which, as previously described in connection with Example 2, give sufficient reinforcement to the composition to withstand the impact of dropping from one floor of a burning building to another, at least under favorable conditions.

In the standard or preferred formulation of this example 3, the density of the composition is 40 lbs per cubic foot, as already mentioned, and as compared with a density of 50 lbs per cubic foot in the standard or preferred formulations of example 1 and example 2. So this represents a weight saving of 20%, as compared with the prior examples. It is an excellent formulation for lightweight fire resistant safes and boxes and containers of various kinds, especially with burn-away outer jackets, and provides good water absorption for lighter weight products, and an improved R factor.

As in the other examples, variation from the above given preferred percentages of the ingredients is possible, while still retaining some of the advantages of the invention. For example, the water may be varied from 29% to 69% of the total weight, the PF may vary from 0.1% to 2.0%, the RCF from 1.0% to 10.0%, the PC from 30% to 60%, the F from 3.0% to 6.0%, and the sodium silicate from zero to 2.0%. Such variations in proportion of ingredients may cause the density of the mixture to vary from 20 lbs per cubic foot to 92 lbs per cubic foot.

Sometimes it is especially desirable to provide a composition which has relatively great heat absorbing power at a fairly low temperature, such as a temperature of 80 or 90 degrees Fahrenheit, for protection of especially sensitive or delicate objects. An example of a composition which will accomplish this will now be given.

| | |
|---|---|
| Water | 37.6% |
| Recycled cellulose fibers (RCF) | 1.1% |
| Portland cement (PC) | 34.1% |
| Foaming agent (F) | 1.7% |
| 37% Sodium silicate (WG) | 0.5% |
| Anhydrous sodium sulfate (NS) | 25.0% |
| | 100.0% |

The ingredients are mixed using the same mixing technique explained in connection with the previous examples. These ingredients in these percentages produce a composition having a density of approximately 56 lbs per cubic foot. As in the other examples, a test is made before removing the mixture from the mixing chamber, and small quantities of water or cement or foam are added as needed to adjust the density to 56 lbs per cubic foot. When any necessary adjustments of density have been made, the mixture is ready to be removed from the mixing chamber and poured into the mold.

It will be noted that this mixture does not contain the polypropylene plastic reinforcing fibers used in some of the other examples, so this mixture does not have the same degree of impact resistance as some of the other compositions which do contain such reinforcing fibers. Therefore it is desirable that this mixture be used with a structure such as shown schematically in FIG. 2, that is, one having a steel or other permanent metallic jacket on the outside, to give the finished article strength against disintegrating when dropped. Of course this mixture can be used without an external metal jacket for producing articles in locations where impact strength is not important, as for example containers on solid ground with no space beneath so that there is no danger of their falling to a lower level, and with adequate protection above the container so there is no danger of having heavy objects fall upon it.

Containers made with wall fillings according to this example 4 are particularly useful in absorbing heat in the early stages of the temperature rise, so as to keep the contents quite cool at least in the initial stages of a fire. Hence in those situations where a fire is quickly extinguished, delicate heat-sensitive contents of the container will not be damaged, where such contents might be damaged in a fire of the same length of time, if stored in a container with a wall composition according to one of the previous examples. The factor in this example which gives the large amount of cooling in the early stages, is the use of the sodium sulfate. It is originally added to the mixture, in the mixing tank, in the form of anhydrous sodium sulfate, but during the mixing process, it takes up water in the mixture and is transformed into what is known as Glauber's salt containing ten molecules of water of crystalization for each molecule of sodium sulfate. Because of the large amount of water thus chemically bonded in the composition, a great deal of heat must be absorbed in raising the temperature at the beginning of a temperature rise such as would be caused by a surrounding fire. It takes approximately 4,030 British Thermal Units (BTU) per cubic foot to raise the temperature of this composition from 80 degrees to 90 degrees Fahrenheit. By the time the 90 degree temperature is reached, the hydrated sodium sulfate has been largely melted but many BTUs have been absorbed in supplying the heat of fusion required to melt the material, so that the contents of the container have been kept relatively cool in these early stages of the fire. If the fire can be extinguished quickly, even very delicate contents are saved. If the fire continues and the surrounding temperature rises higher, still further protection is obtained and more heat is abosrbed, especially in the vicinity of 212 degrees F. where Glauber's salt is decomposed and thus absorbs the heat of vaporization. Then raising the temperature from 212 degrees to 220 degrees requires input and absorption of much more heat but this is true also of the other mixtures disclosed in examples 1, 2, and 3. All of these have great absorption capacity in this range from 212 to 220 due to the presence of water entrapped mainly in the cellulose fibers and to a slight extent in the plastic fibers. But this composition of example 4 is superior to examples 1, 2, and 3 in its capacity for heat absorption in the lower range of 70 to 90 degrees, which has the great advantage above mentioned, and also in its capacity for absorption at about 212 while the salt is decomposed.

In addition to being useful in the walls of containers, this composition of example 4 is useful in making panels for fire doors in building structures, and in making panels for modular furniture, and wall and ceiling panels for rooms, and panels for shelving, as further discussed below. Also, one possible use is for making drawers for furniture or drawers or chests to be placed in old style standard safes which are intended mainly for burglary protection and which do not give much fire protection.

Drawers or chests or other small containers having walls made of this composition would give significant protection to contents against damage by surrounding temperatures caused by moderate fires.

The ingredients of this composition in example 4 are preferably in the proportions stated in the above table, which may be considered a standard or preferred formula for this composition. However, just as in the other examples, variations are possible. For example, the amount of water may vary from 17.5% to 57.5% of the total composition, the RCF from 0.1 to 10.0%, the PC from 14.1 to 54.1%, the foaming agent from zero to 6%, the WG from zero to 2%, and the NS from 15% to 35%. Depending on such variations, the density, which is 56 lbs per cubic foot in the preferred or standard mixture, may vary from 36 to 104 lbs per cubic foot.

It has been mentioned that this composition of example 4 does not contain the polypropylene reinforcing fibers used in some of the other examples, and that, accordingly, this composition should not be used where high impact resistance is needed, unless a steel or other permanent structural outer jacket is employed. It is possible, however, to use the reinforcing fibers in a composition basically similar to that of example 4, thus enabling the composition to have sufficient impact resistance so that a plastic or burn-away outer jacket may be used in place of a steel jacket. Such a modification of the composition will now be described.

EXAMPLE 5

| | |
|---|---|
| Water | 37.3% |
| Reclaimed cellulose fibers (RCF) | 1.1% |
| Polypropylene fibers (PF) | 0.5% |
| Portland cement (PC) | 34.0% |
| Foaming agent (F) | 1.7% |
| Sodium Silicate (WG) | 0.5% |
| Anhydrous sodium sulfate (NS) | 24.9% |
| | 100.0% |

The ingredients are mixed in the manner previously described in connection with the other examples. It is believed that in view of what has already been said above, the exact mixing technique for this and the other examples will be understood by those skilled in the art. But for the sake of giving an exact and specific account of the mixing technique that may be used, for example, in preparing the mixture of example 5, the following information is offered.

Using the mixing equipment previously described, with the special impeller or rotary mixer blade, place in the mixing tank 1,047 lbs of water, 31 lbs of shredded cellulose fibers, and 14 lbs of polypropylene fibers of from ½ inch to 1½ inches in length, and with a thickness from 3 denier to 20 denier. Start the mixer rotating at a speed of from 200 to 1,000 revolutions per minute. While the mixer is rotating, add 952 lbs of Portland cement, type 1 or 3. Continue mixing for 5 minutes after completion of adding the Portland cement. Add 48 lbs of 8% foam through a Mearl foam generator, the foam being produced from Mearl Airocel PK foam liquid. The impeller blade continues rotating while th foam is added. Then, while still rotating the impeller, add 14 lbs of 37% sodium silicate and continue mixing for 2 minutes. Then add 697 lbs of anhydrous sodium sulfate, and continue mixing for 2 minutes more. Check the density of the mix, and adjust it to 56 lbs per cubic foot by adding small quantities of water, cement, or foam as needed to obtain this density. The mixture is then ready for pouring into the mold formed by the liner and jacket of the safe or container, or any other desired mold for forming this composition into any desired shape.

This composition according to example 5 has the same advantages above mentioned in connection with Example 4, and in addition it has the further advantage of higher impact resistance than the composition of example 4, so that it may be safely used, as already stated, as the wall filling for a container with a plastic or burn-away outer jacket rather than a steel or other permanent outer jacket. The heat absorption is approximately the same as mentioned in connection with example 4.

In this example, and in any of the other examples where sodium silicate has been mentioned as an ingredient, ordinary water glass is normally used. However, sodium metasilicate may be substituted. Also other sodium salts with relatively large amounts of water of crystalization may be substituted, such as sodium carbonate decahyrate, or sodium tetraborate (borax). Any of these salts are added as anhydrates or lower hydrates, and are hydrated to their highest state from the free water in the mix.

Another mixture suitable for purposes of the present invention is the following.

| | |
|---|---|
| Water | 37.1% |
| Reclaimed cellulose fibers (RCF) | 1.1% |
| Steel fibers (IF) | 1.8% |
| Polypropylene fibers (PF) | 0.3% |
| Portland cement (PC) | 33.8% |
| Sodium silicate (WG) | 0.5% |
| Anhydrous sodium sulfate (NS) | 24.8% |
| 8% Foaming agent (F) | 0.6% |
| | 100.0% |

These ingredients mixed in the proportions above stated in example 6 will yield a mixture having a density of about 80 pounds per cubic foot. The ingredients are mixed in the manner already described above in connection with other examples, and near the end of the mixing operation are tested and adjusted to add a little more of one or another of the main ingredients of Portland cement, water, sodium sulfate, or foaming agent in order to bring the mixture to exactly the standard density of 80 pounds per cubic foot as intended for this example, or whatever other density may be desired in place of the standard density. As in the other examples, proportions may be varied within reasonable limits without departing from the invention. For example, the amount of water may vary from 20% to 60% of the total composition, the RCF from 0.1 to 10%, the IF from 0.1 to 10%, the PC from 14 to 54%, the WG from zero to 2%, the NS from 15% to 35%, and the F from zero to 6%. Depending on such variations, the density, which is 80 pounds per cubic foot in the preferred or standard mixture, may vary from around 40 to 50 pounds per cubic foot up to around 106 pounds per cubic foot.

It will be noted that this example 6 includes the use of steel or iron fibers. They may be of approximately the same diameter and said length as the polypropylene fibers already described, and they add to the strength of the material, especially giving it higher impact strength. Therefore, this mixture of example 6, because it contains the steel fibers, is suitable for use as the filling for a safe having a burn-away outer jacket, since the steel fibers add sufficient impact strength so that the safe will survive a drop after the outer jacket has burned away, without serious disintegration. Steel or iron fibers may be added also to the mixtures disclosed in the other examples previously given, to give additional impact strength to the those mixtures.

The mixture as disclosed in connection with example 6 is particularly suitable for forming parts or panels of modular furniture. The structural strength of the composition or mixture enables panels to be made comparatively thin, yet have sufficient strength for furniture purposes. Likewise, this composition of example 6 is, for the same reason, particularly suitable for forming structural panels intended for building walls, ceilings, partitions, storage boxes, and so forth. The compositions disclosed in any of the examples could be used for these purposes, and it is not intended to rule them out for use in making structural panels, but it is believed at present that the composition of example 6 is more suitable than the others for this particular purpose.

Figure 3:
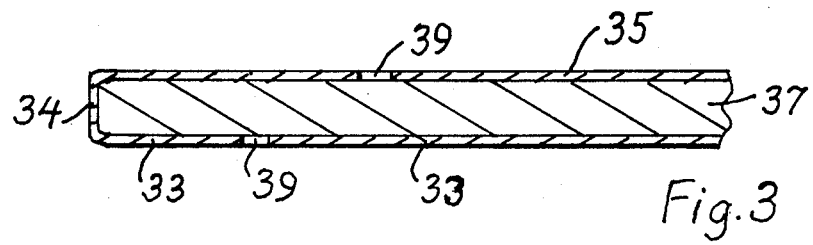
FIG. 3 is a similar section through a fragment of a construction panel.

An example of such structural panels is shown schematically in FIG. 3. Liners 33 and 35, of thin sheet metal or of rigid or semi-rigid plastic material constitute a mold or form which is filled with the filling 37, such as the composition disclosed in foregoing example 6, although it could be a composition according to any of the other examples. The liner material is carried around the edge as at 34. Small holes 39, say ¼ or ½ inch in diameter, are placed at intervals on one or both facing liners 33 and 35 to allow escape of steam or other vapor if the structure is heated to the vaporizing temperature. If some provision were not made for escape of vapor, an explosion might result when vaporizing temperature is reached, due to the large amount of water contained in the mixture.

These panels may be of any desired size. One of the features of the invention is that such panels be made in conventional lumber dimensions, say 1 inch or 1¼ inches or 1½ inches thick, 12 inches or 24 inches wide, and in various convenient lengths, such as 4 feet, 6 feet, and 8 feet. Then such panels may be nailed to conventional studs or rafters, to make walls or ceilings, the facings 33 and 35, if of sheet metal, being sufficiently thin so that nails can be driven through them.

In this way, a "cool room" could be constructed within a building, at modest expense. If a fire occurs in adjacent parts of the building, the walls of the "cool room" constructed as above described would absorb much of the ambient heat and keep the interior of the room at a lower temperature than the exterior. A small "cool room" constructed of panels above described, located in a basement or a wing of a building, could quite likely keep the interior of the room at a temperature below 150 degrees Fahrenheit even during a fire of moderate intensity and length of time, and this would be especially valuable for protecting electronic records and electronic equipment, which ordinarily should not be subjected to heat above 150 degrees. The coolness of the room would be enhanced by making the storage shelves within the room from panels of this same material, and using this same material for any desired storage bins, tables, or other furniture within the room, since the greater the quantity of this material within the room as well as in the walls of the room, the more heat would be absorbed by this material.

According to another aspect of the invention, the material or composition of any of the examples above given, but especially the composition of example 6, may be used to cast a building wall in place, between forms erected to hold the mixture while it is in a plastic or flowable state, and later removed after the mixture solidifies, similar to the way that ordinary conventional concrete walls are cast in place. This applies also, of course, to floors, ceilings, and roofs. Thus, an entire building may be built using one or another of the compositions here disclosed (preferably the composition of example 6) with the various parts cast in place and with conventional re-enforcing rods imbedded in the composition, similar to the way a re-enforced concrete building is conventionally constructed. Alternatively, the main part of the building may be constructed in other ways, and a "cool room" within the building may be constructed by pouring the composition of example 6 (or other desired example) between forms, and likewise pouring the ceiling, rather than building up the wall and ceiling from panels nailed to studs, joists, or other supports.

In the foregoing description, emphasis has been placed mainly on the heat absorbing characteristics of the compositions of the present invention, as a means of absorbing heat so as to keep the interior of a safe or room or storage container relatively cool during a fire. There is, however, another important feature or aspect of the invention, not necessarily related to fires. This other aspect of the invention is the use of the various compositions above disclosed as what may be called a "heat sink", to absorb excess heat from any source (for example, solar heat) and to radiate it back into the environment when the ambient temperature cools down below the temperature at which heat was absorbed.

In climates where typical daytime temperatures are hotter than comfortable temperatures and where nighttime temperatures are cooler than comfortable, a building having walls and roof made from a composition according to the present invention (preferably according to example 6) would be especially beneficial. The walls and roof may be either cast in place, or built up of panels containing the composition of the invention. In either event, the walls and roof would tend to absorb the excess heat during the day, keeping the interior of the building cooler than the surrounding temperature, and then at night the heat stored in the building structure would be radiated, warming the building at night. This beneficial effect would be enhanced if interior partitions and ceilings are also made of a composition according to the present invention.

The composition of the present invention is useful also in making growing tables for residential or commercial greenhouses, which tables may be either cast, or made of the described panels. During the day, such tables tend to absorb the excess heat and prevent overheating of the growing plants and vegetables, and at night they radiate the heat absorbed during the day, greatly reducing night heating costs.

The above described action of heat absorption and reradiation is limited by the temperature to which the composition is subjected during the heating part of the cycle. So long as the temperature does not rise to the point where the salts are broken down or where the contained water is vaporized and escapes as steam, the heat absorbing phase of the cycle is followed by the radiating phase when the ambient temperature cools, and the cycle may be repeated over and over again indefinitely. This would be the normal cycle, from solar heating. But when a fire occurs and much higher temperatures are encountered, the contained water is driven off as steam, and the alkali metal salts may be broken down, so that thereafter the heat absorbing and subsequent heat radiating cycle may not operate efficiently. But it is interesting to note that until a fire occurs, the heat absorbing and re-radiation cycle does occur, and then when the fire occurs, the very large heat absorbing capacity is available to cool the fire, with much greater heat absorbing capacity than is used in the repetitive cycle before the fire.

The following table is provided as a rough guide to the approximate heat absorbing capacity of the various mixtures or compositions set forth in examples 1 through 6. The figures refer to absorption in British thermal units in various temperature ranges expressed in degrees Fahrenheit, per cubic foot of the mixture or composition.

TABLE 1

| Temperature range °F. | BTUs per cubic foot | | | | | |
|---|---|---|---|---|---|---|
| | Ex. 1 | Ex. 2 | Ex. 3 | Ex. 4 | Ex. 5 | Ex. 6 |
| 70-90 | 330 | 330 | 264 | 4400 | 4400 | 6261 |
| 90-212 | 2013 | 2013 | 1610 | 2255 | 2255 | 3220 |
| 212-220 | 21600 | 17700 | 17500 | 18000 | 18000 | 24600 |
| 220-350 | 1218 | 1394 | 965 | 1630 | 1630 | 2376 |
| Total | 25161 | 21437 | 20339 | 26285 | 26285 | 36457 |

It will be noted that there is considerable difference in the heat absorbing characteristics of the different compositions. Examples 1, 2, and 3 give good total heat absorption, but not very much in the range below 90 degrees. Examples 4 and 5 provide a great amount of heat absorption below 90 degrees, together with a good amount between 90 and 212 degrees, so these compositions of examples of 4 and 5 are particularly suitable for use in making safes or containers for protecting delicate articles which cannot stand heat, as for example electronic or magnetic tape records.

The table shows that the composition of example 6 has even greater heat absorbing capacity than the examples of exhibits 4 and 5, both in the low ranges and in total. This is partly due to the fact that the composition of example 6 is heavier or more dense, weighing 80 or more pounds per cubic foot as compared with 56 pounds per cubic foot in examples 4 and 5, but the greater heat absorbing capacity is due only partly to the density of the material and is due in large measure to the ingredients of the composition. This composition of example 6 is therefore the best of all the compositions, on heat absorbing capacity on a cubic foot basis, where weight is not important. However, where a lighter weight structure is desired, the materials of examples 4 and 5, which weigh only 56 pounds per cubic foot in the standard mixture, may give sufficient fire protection to preserve delicate articles contained in a safe or storage box or "cool room" using these compositions rather than the heavier composition of example 6. There is also a cost factor as well as a weight factor to be considered, since the heavier weight requires more material and therefore greater cost of raw material.

The compositions of examples 1 and 2, weighing 50 pounds per cubic foot, and the composition of example 3, weighing 40 pounds per cubic foot, can be used to produce lighter structures at lower cost. In many cases a safe or other container with its walls filled with these compositions will give sufficient protection for the intended purpose. In selecting the particular composition to be used for constructing a particular safe or box or panel or room, it is a question of balancing the various factors of cost, weight, and intended use of the final product, including the heat vulnerability or sensitivity of the contents which are to be preserved, the type of surrounding construction evaluated as to whether a fire is likely to be a very hot fire or a moderately hot fire and whether it is likely to be of a long duration or quickly extinguished, the type of jacket used on the exterior of the safe or storage container, and what drop tests, compression tests, or other tests the safe or container or other structure must pass in order to be approved by the fire underwriters or other approving agency. Hence there is no one formula or composition which is best universally for all purposes. Enough different formulas and possible variations have been disclosed to illustrate well the concepts and important features of the present invention, and to teach those skilled in the art how still other variations are possible within the scope of the invention.

It may be mentioned here that steel fibers, specifically referred to in connection with example 6, may be added to the compositions referred to in any of the other examples, where extra strength is desired, particularly strength in resisting shattering when the safe or other article is dropped. However, steel fibers (or other metallic fibers) have the disadvantage that they tend to conduct heat through the thickness of the wall of the safe or container or panel or other structure in which such fibers are used. Therefore, it is not ordinarily desirable to use metallic fibers unless very high strength is required. In many cases, the requisite resistance to shattering when dropped can be given by encasing the safe or container in a steel jacket, so that no metallic fibers in the thickness of the wall are needed. In example 6, steel or iron fibers are included in the preferred formula for the sake of strength, and this formula has such a very large capacity for absorbing heat that the slight increase in heat transmission through the thickness of the material, on account of the metallic fibers, is not seriously detrimental.

With regard to the use of cellulose fibers (whether new or reclaimed) which are used in many of the examples, it is pointed out that the use of cellulose fibers act as any other diluent and reduce somewhat the compression strength of the concrete mixture. However, they increase the impact strength and tensile strength, which in general are more important of the present invention than the compression strength. More importantly, the cellulose fibers seem to serve to hold the salt containing mixes together when they expand slightly on crystallization. This expansion would tend to disrupt or crumble the mixture as it solidifies, if it were not held together by the fibers, such as the cellulose fibers used in most of the examples, or the plastic fibers used together with the cellulose fibers or in the examples where there are no cellulose fibers.

Another point briefly mentioned above, but worth repeating and emphasizing in connection with the discussion of fibers, is that the fibers, especially cellulose fibers, serve very well in plugging small leaks in a metal jacket as the flowable or semi-liquid mixture is being poured into the wall structure of a safe or other container, between the outer jacket and an inner liner. A sheet metal jacket can be made much more quickly and at less expense if it is not necessary to take extra care in making it absolutely watertight along the edges and corners, and if very slight cracks at edges and corners can be tolerated. Then when the mixture is poured in, the fibers, either the polypropylene plastic fibers or the cellulose fibers, but especially the latter, will tend to enter the small cracks or leaks and plug them up, preventing further leakage of significant amounts. The same is true when using these compositions to manufacture articles such as metal clad fire doors, where the mixture is poured between metal sheets forming the outer faces of the doors, and where the fibers in the mixture make it unnecessary to ensure absolute watertightness along the edges of the door structure.

What is claimed is:

1. A heat absorbing body which in solid hardened form is capable of absorbing substantial amounts of heat by providing relatively and unusually large quantities of absorbed water capable of being vaporized by heat and thus absorbing the quantity of heat required to vaporize the absorbed water, said body in its final solidified hardened state ready for use comprising a mixture containing, by weight, not less than 29% nor more than 70% of water, and not less than 33% nor more than 54% dry weight of Portland cement as primary ingredients, and also including as secondary ingredients not less than 1% nor more than 10% dry weight of recycled cellulose fibers having high water absorption and retention capacity, and sufficient foaming agent to cause foaming of the body, before hardening thereof, to a density of not less than 40 nor more than 80 pounds per cubic foot.

2. The invention defined in claim 1, wherein said secondary ingredients also include sodium sulfate.

3. The invention defined in claim 2, wherein the total of all said secondary ingredients are not more than 65 percent by weight of the total mixture.

4. The invention defined in claim 2, wherein said sodium sulfate is originally present in said mixture in anhydrous form and in a quantity not less than 15 percent nor more than 35 percent by weight of the total mixture.

5. The invention defined in claim 1, wherein said mixture has approximately the following composition by weight:

| | |
|---|---|
| Water | 50.0% |
| Cellulose fibers | 1.5% |
| Portland cement | 45.5% |
| Foaming agent | 2.3% |
| 37% Sodium silicate | 0.7% |
| | 100.0% |

6. The invention defined in claim 1, wherein said mixture has approximately the following composition by weight:

| | |
|---|---|
| Water | 49.1% |
| Polypropylene plastic fiber | 0.5% |
| Cellulose fibers | 1.5% |
| Portland cement | 44.6% |
| Foaming agent | 3.6% |
| 37% Sodium silicate | 0.7% |
| | 100.0% |

7. The invention defined in claim 1, wherein said mixture has approximately the following composition by weight:

| | |
|---|---|
| Water | 37.6% |
| Cellulose fibers | 1.1% |
| Portland cement | 34.1% |
| Foaming agent | 1.7% |
| 37% Sodium silicate | 0.5% |
| Anhydrous sodium sulfate | 25.0% |
| | 100.0% |

8. The invention defined in claim 1, wherein said mixture has approximately the following composition by weight:

| | |
|---|---|
| Water | 37.3 |
| Cellulose fibers | 1.1% |
| Polypropylene fibers | 0.5% |
| Portland cement | 34.0% |
| Foaming agent | 1.7% |
| Sodium silicate | 0.5% |
| Anhydrous sodium sulfate | 24.9% |
| | 100.0% |

9. The invention defined in claim 1, wherein said mixture has approximately the following composition by weight:

| | |
|---|---|
| Water | 37.1% |
| Cellulose fibers | 1.1% |
| Steel fibers | 1.8% |
| Polypropylene fibers | 0.3% |
| Portland cement | 33.8% |
| Sodium silicate | 0.5% |
| Anhydrous sodium sulfate | 24.8% |
| 8% Foaming agent | 0.6% |
| | 100.0% |

10. The invention defined in claim 1, further comprising an inner liner member and an outer jacket member confining said heat absorbing body between them, said members being shaped to form part of a fire-resistant container such as a safe for holding valuables to be protected against the heat of a fire.

11. The invention defined in claim 10, wherein said outer jacket is of plastic material which may burn away during the progress of a fire surrounding said container.

12. The invention defined in claim 10, wherein said outer jacket is of strong metal.

13. The invention defined in claim 10, wherein the fibers in said heat absorbing body include a significant quantity of cellulose fibers which absorb water and thus retain water in said body and which also tend to plug any minor leaks in said inner liner member and outer jacket member as said mixture is poured into a space between said liner member and jacket member.

14. The invention defined in claim 1, further comprising facing members covering and enclosing said heat absorbing body within them, said facing members and the enclosed heat absorbing body being shaped to form a panel useful for general construction purposes in constructing walls, ceilings, shelves, containers, and furniture.

15. The invention defined in claim 14, wherein said mixture from which said heat absorbing body is formed has approximately the ingredients in the proportions by weight specified in claim 13.

16. The invention defined in claim 1, wherein said heat absorbing body is in the form of a structure for absorbing and re-radiating heat, to absorb solar heat during a hot day and to release and re-radiate the absorbed heat during a cool night.

17. The invention defined in claim 7, wherein said heat absorbing body is in the form of a structure for absorbing and re-radiating heat, to absorb solar heat during a hot day and to release and re-radiate the absorbed heat during a cool night.

18. The process of making a shaped heat absorbing article from a flowable composition which is pourable into a confined space and which will solidify in such space to provide a body containing and retaining a relatively and unusually large quantity of absorbed water capable of absorbing a large quantity of heat required to vaporize such retained water, said process comprising the steps of subjecting to the action of a hammer mill fibrous products chosen from the group consisting of newspaper, kraft paper, and wood chips, to produce therefrom cellulose fiber masses, mixing the fiber masses with other ingredients including water and Portland cement and a foaming material in such proportions as to provide a flowable composition which, in its flowable state ready to be poured, contains by weight of the entire composition, not less than 29% nor more than 70% of water, and not less than 1% of said cellulose fiber masses, and pouring said composition into a confined space and allowing it to solidify therein without subjecting it to any dewatering action.

19. The invention defined in claim 18, wherein said fiber masses are of a character to absorb water relatively slowly, so that when said composition is first mixed, much of the water therein will be available to enhance the flowability of the composition, and after the composition has been poured into the confined space, it will become stiffer at least partly because of the absorption of water into said fiber masses.

20. The invention defined in claim 18, further comprising the step of mixing sodium sulfate in not fully hydrated form into said composition before the pouring thereof, and providing sufficient water in the composition to cause the sodium sulfate to become hydrated therein.

21. The invention defined in claim 18, further comprising the step of mixing anhydrous sodium sulfate into said composition, and providing sufficient water in the composition to cause the sodium sulfate to become hydrated.

22. An energy saving construction material capable of absorbing significant quantities of solar heat during a hot day and releasing and re-radiating a significant amount of the absorbed heat during a cool night, said material comprising a substantially solidified composition whose principal ingredients are foamed cementitious material, recycled cellulose fibers, sodium sulfate, and water, the cellulose fibers and sodium sulfate serving to retain water in the form of absorbed and/or chemically bonded water, the cellulose fibers and sodium sulfate being present in sufficient quantity so that the total water content of the solidified composition, including absorbed and chemically bonded water, is not less than about 29% by weight of the composition.

23. The invention defined in claim 22, further comprising a covering layer of moisture barrier material covering and confining at least the major part of the surface of said composition.

24. The invention defined in claim 22, wherein sodium sulfate is present to the extent of not less than about 25% by weight of the composition.

* * * * *

UNITED STATES PATENT AND TRADEMARK OFFICE
CERTIFICATE OF CORRECTION

PATENT NO. : 4,263,365
DATED : April 21, 1981
INVENTOR(S) : George M. Burgess and Roland M. Avery, Jr.

It is certified that error appears in the above-identified patent and that said Letters Patent are hereby corrected as shown below:

Column 7, after line 41 and before the table, insert

--EXAMPLE 4--.

Column 10, after line 25 and before the table, insert

--EXAMPLE 6--.

Signed and Sealed this

Thirtieth Day of June 1981

[SEAL]

Attest:

RENE D. TEGTMEYER

Attesting Officer

Acting Commissioner of Patents and Trademarks